United States Patent
Wang

(10) Patent No.: US 6,797,046 B2
(45) Date of Patent: Sep. 28, 2004

(54) STRUCTURE OF A DUST-FILTERING MODULE OF A DUST-COLLECTING DEVICE

(76) Inventor: Chun-Hsiang Wang, PO Box 82-144, Taipei (TW)

( * ) Notice: Subject to any disclaimer, the term of this patent is extended or adjusted under 35 U.S.C. 154(b) by 0 days.

(21) Appl. No.: 10/226,273

(22) Filed: Aug. 23, 2002

(65) Prior Publication Data

US 2004/0035295 A1 Feb. 26, 2004

(51) Int. Cl.[7] ............................ B01D 29/64; B01D 46/04
(52) U.S. Cl. .............................. 96/421; 55/283; 55/297; 55/357; 55/429
(58) Field of Search ............................ 96/421; 55/283, 55/284, 295–297, 300, 357, 428, 429, 433

(56) References Cited

U.S. PATENT DOCUMENTS

| | | | | |
|---|---|---|---|---|
| 2,722,997 A | * | 11/1955 | Turner ........................... | 55/291 |
| 3,487,623 A | * | 1/1970 | Easter ........................... | 55/296 |
| 3,910,781 A | * | 10/1975 | Bryant, Jr. ..................... | 55/305 |
| 3,979,194 A | * | 9/1976 | Wiser ............................ | 55/296 |
| 4,061,480 A | * | 12/1977 | Frye et al. ..................... | 55/356 |
| 4,133,658 A | * | 1/1979 | Callewyn ....................... | 55/315 |
| 4,695,299 A | * | 9/1987 | Spadaro et al. | |
| 4,735,639 A | * | 4/1988 | Johnstone ..................... | 55/302 |
| 4,963,172 A | * | 10/1990 | DeMarco ....................... | 55/429 |
| 4,983,290 A | * | 1/1991 | Schumann .................... | 210/413 |
| 5,163,985 A | * | 11/1992 | Chen ............................. | 55/356 |
| 5,226,938 A | * | 7/1993 | Bailey et al. .................. | 55/305 |
| 5,271,751 A | * | 12/1993 | Lagler .......................... | 55/295 |
| 6,010,576 A | * | 1/2000 | Lin ................................ | 134/8 |
| 6,119,299 A | * | 9/2000 | Lin ............................... | 15/246.5 |
| 6,221,135 B1 | * | 4/2001 | Wirth et al. ................... | 95/273 |
| 6,507,974 B1 | * | 1/2003 | Cheng .......................... | 15/347 |

FOREIGN PATENT DOCUMENTS

TW             87219902       11/1999

* cited by examiner

*Primary Examiner*—Robert H. Spitzer
(74) *Attorney, Agent, or Firm*—Leong C. Lei

(57) ABSTRACT

An improved structure of a dust-filtering module of a dust-collecting device which is characterized in that the top end of the mounting body is provided with a top mounting ring having an L-shaped cross-section, a fastening structure is formed between the mounting body and the dust-filtering module, the dust-filtering module is provided with an external hood body connected to a connection hose, a filtering device is provided within the dust-filtering module, the filtering device has a corrugated board having a bottom face mounted across a bottom rod, the bottom rod is pivotally mounted with an axle passed through the filtering device, the circumferential edge of the axle is provided with a plurality of wiping plates which resist the corrugated filtering board, and the axles which passes out of the external hood body locked to a rocking shaft.

9 Claims, 5 Drawing Sheets

STRUCTURE OF A DUST-FILTERING MODULE OF A DUST-COLLECTING DEVICE

BACKGROUND OF THE INVENTION

1. Field of the Invention

This invention relates to the field of cleaning of the dust-filtering module of a dust-collecting device, and in particular, the filtering device of the dust-filtering module can be cleaned externally and the filtering device can be easily withdrawn.

2. Description of the Prior Art

Taiwanese Patent Publication No. 374331 related to scraping structure of a dust-collector discloses the dust-collecting cylinder having a scrap structure and the structure is provided with a scraping board which urging the surface of the dust-collection board and the housing thereof. When dust is collected on the dust-collection board the scraping board is rotated to remove the dust.

However, this design has the following drawbacks:

(1) If the blockage of the dust is serious, the scraping structure cannot be operated and the entire filtering device has to be unloaded so as to proceed with a major cleaning or a replacement of a filtering device.

(2) The efficiency of the dust-filtering cannot be detected. Only when the user faces a very low efficiency of dust-filtering, he can then realize the need of a change of a filtering device or a major cleaning. Accordingly, it is an object of the present invention to provide an improved structure of a dust-collecting module of a dust-collecting device, which overcomes the above-mentioned drawbacks.

SUMMARY OF THE INVENTION

The main object of the present invention is to provide an improved structure of a dust-filtering module of a dust-collecting device having a platform mounted with a dust-collecting module and a blower driven by a driving element, and the top end of the dust-collecting module being connected to the dust-filtering module by a mounting body, characterized in that the top end of the mounting body is provided with a top mounting ring having an L-shaped cross-section, which can be mounted onto the bottom edge of the dust-filtering module and a fastening structure is formed between the mounting body and the dust-filtering module such that the dust-filtering module and the mounting body can be engaged with each other and can be separated from each other; and the dust-filtering module is provided with an external hood body connected to a connection hose, and the connection hose can be mounted to a hose connected to the bower, and a filtering device is provided within the dust-filtering module and the filtering device has a corrugated board surrounded thereto and the bottom face of the board is mounted across a bottom rod, and the bottom rod is pivotally mounted with an axle passed through the filtering device, and the circumferential edge of the axle of provided with a plurality of wiping plates which resist the corrugated filtering board, and the axle passed through the top center face of the external hood body, and the axle which passes out of the external hood body is locked to a rocking shaft, thereby and easily cleaned and replaced dust-filtering module of the dust-collecting device is obtained.

A further object of the present invention is to provide and improved structure of a dust-filtering module of a dust-collecting module, wherein the bottom edge of the external hood body of the dust-filtering module is provided with an arch shaped bent protruded ring edge and a top mounting ring having an L-shape in cross-section is formed on the top edge of the mounting body of a moving seat, and the inner bottom edge of the top mounting ring is provided with a recessed ringed slot for sealingly engaging of the dust-filtering module and the mounting body.

Features and advantages of the invention will be evident from the following detailed description of the preferred embodiment described in conjunction with the attached drawings.

DETAILED DESCRIPTION OF THE PREFERRED EMBODIMENT

Figure 1:
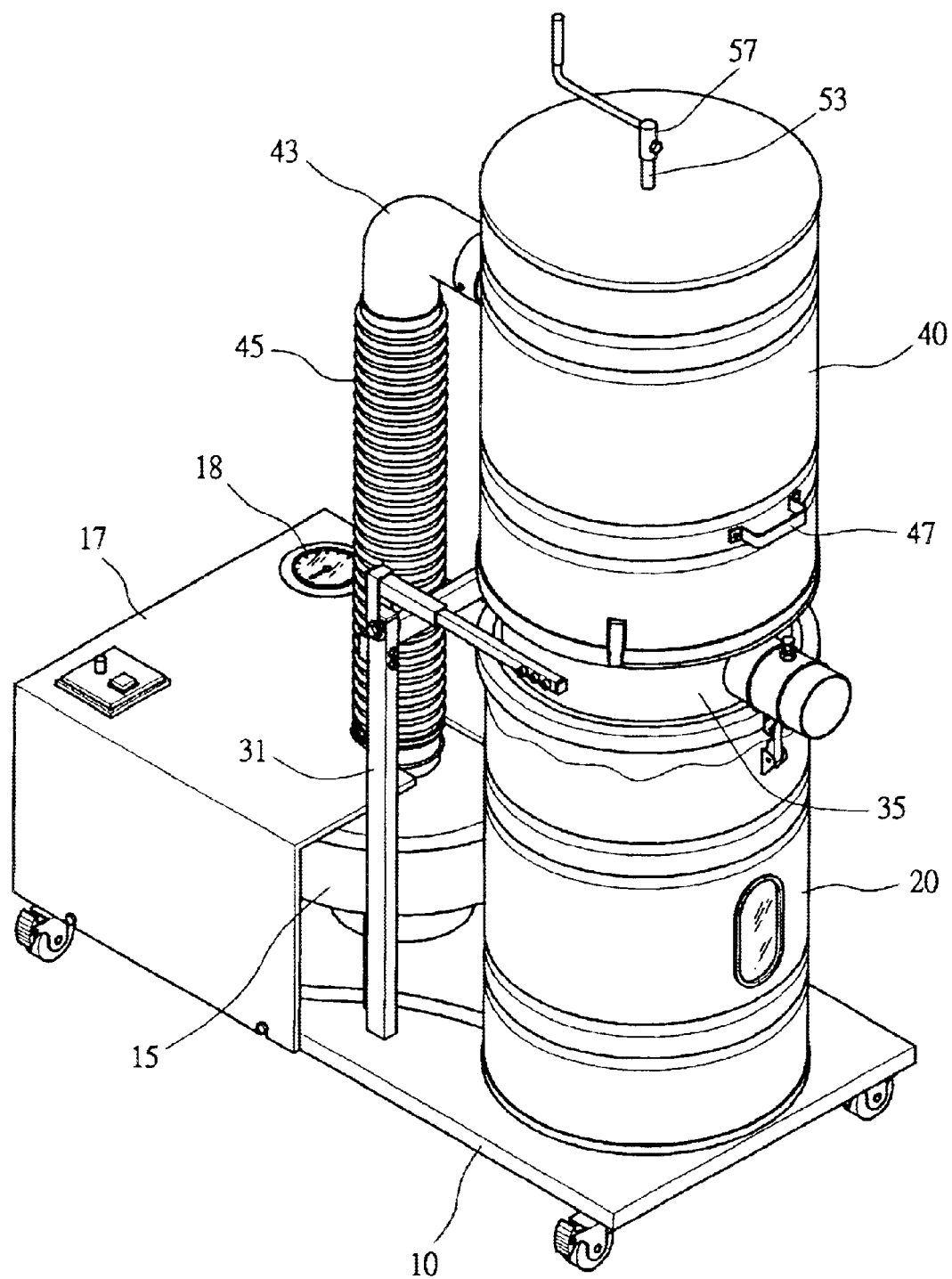
FIG. 1 is a perspective view of the present invention.
Figure 2:
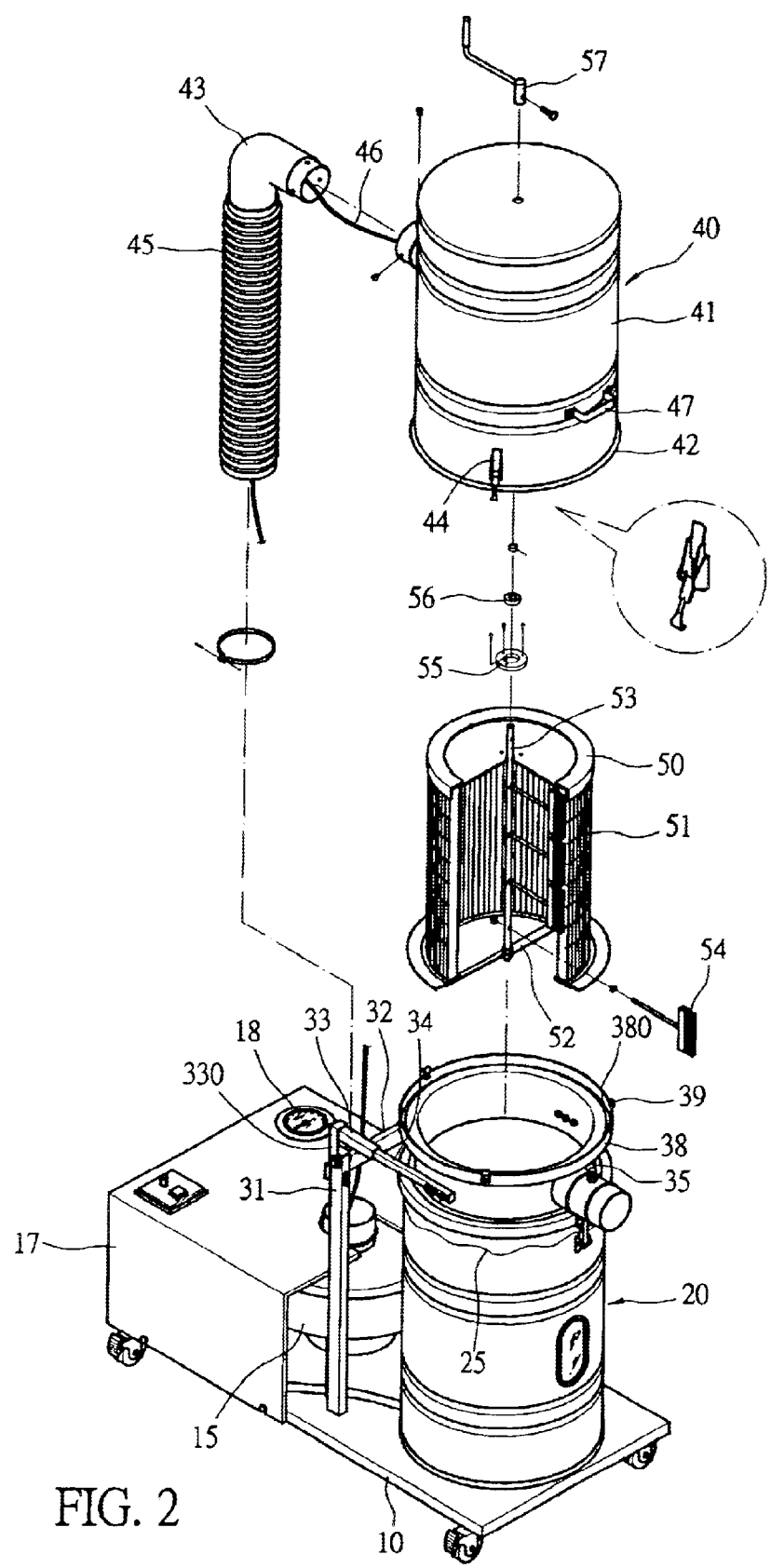
FIG. 2 is a perspective exploded view of the present invention, wherein the individual components are shown.
Figure 3:
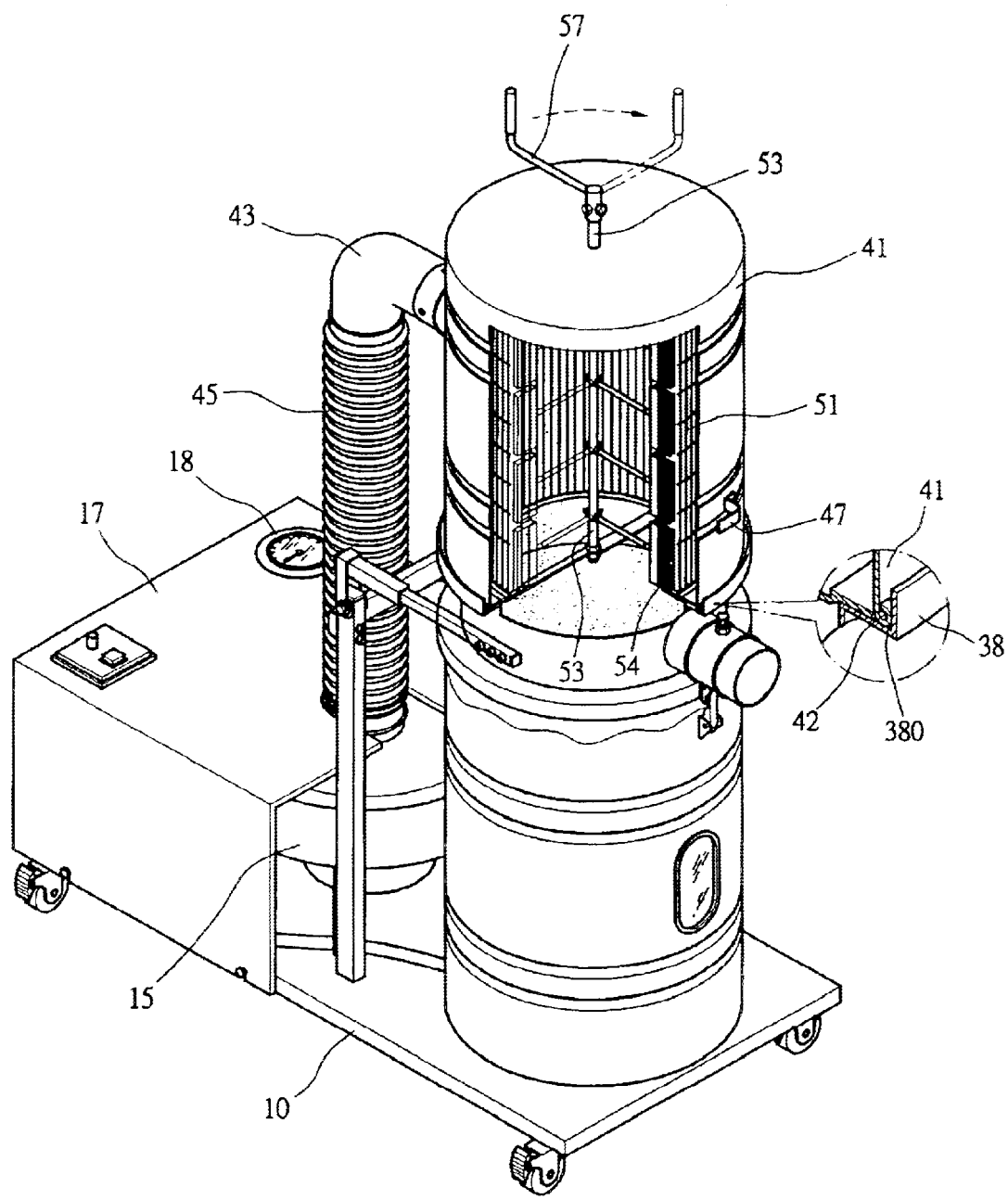
FIG. 3 is a partial sectional view of the present invention, showing the cleaning of the module in a practical operation situation in accordance with the present invention.

With reference to the drawings, in particular to FIG. 1 and FIG. 2, a moving seat 30 is provided between the dust-collecting module and the blower 15 and the moving seat 30 can be mounted to a mounting body 35. The moving seat 30 on the platform 10 is provided with two upright rods 31 having the top end mounted with a horizontal rod 32. The top end of the two upright rods 31 are pivotally mounted with a side rod 33 using a pivotal lug 330. The two side rods 33 are respectively mounted to an extended rod 34 extending to the dust-collecting module 20. The ring shape mounting body 35 is locked in between the two extend rods 34 and the top end edge and the bottom edge of the mounting body 35 are formed into an L-shaped top and bottom mounting ring 38, which can be appropriately mounted on to the bottom edge of the dust-filtering module 40 and the top edge of the dust-collecting module 20. The inner bottom edge of the top mounting ring 38 is provided with a ringed slot 380. The top and bottom edge of the external circumferential edge of the mounting body 35 is provided with a fastening plate 39 which can be used to engage with the dust-filtering module 40 and the dust-collecting module 20 A filtering device 50 is positioned within the external hood body 41 of the dust-filtering module 40 and the bottom edge of the external hood body 41 is a protruded ringed edge 42 (as shown in FIG. 3) which is corresponding to the mounting ring 38 of the mounting body 35. The bottom edge of the external circumferential face of the external hood body 41 is provided with a plurality of fastening elements 44 of the fastening plate 39 to correspond to the mounting body 35, such that the dust-filtering module 40 is fastened to the top end of the mounting body 35. The top edge of the external hood body 41 is provided with a connection hose 43 which is connected to a soft hose 45 of the blower 15. The dust-filtering module 40 is externally mounted with a wind speed detector and via signal tube 46, it is connected to a pressure gauge 18 mounted on the housing body 17 so as to detect the wind speed of the filtering device so as to decide the timing of cleaning. The external hood body 41, close to the bottom edge of the circumferential edge thereof, is provided with handle 47 so as to facilitate the opening of the filtering module 40.

The filtering device 50 has corrugated board 51 surrounded thereof and the bottom face of the corrugated filtering board 51 is provided with a bottom rod 52. The bottom rod 52 is pivotally mounted with an axle 53 passed through the center of the filtering device 50. The circumferential edge of the axle 53 is provided with wiping plate module 54 urging the inner edge face of the corrugated filtering board 51. The top end center of the filtering device 50 is a bearing seat 55 having a bearing 56 for the passage of the axle 53. The axle 53 can pass through the top face center of the external hood body 41 and the axle 53 passes through the external hood body with a portion being locked to the rocking shaft 57 for the user to drive the wiping module 54 on the axle 53 by means of the rocking shaft 57 and the dust on the inner edge face of the corrugated filtering board 51 is removed. Thus, an improved structure of the dust-filtering module of the dust-collecting module which can be easily cleaned and replaced is obtained.

As shown in FIG. 3, when the value of the pressure gauge 18 shows the wind speed at the filtering module 40 being low, this indicates that the dust-sucking efficiency is low and the user just rotate the rocking shaft 57 and the wiping plate module 54 will rapidly clean the dust on the inner ring face of the corrugated filtering board 51.

Figure 4:
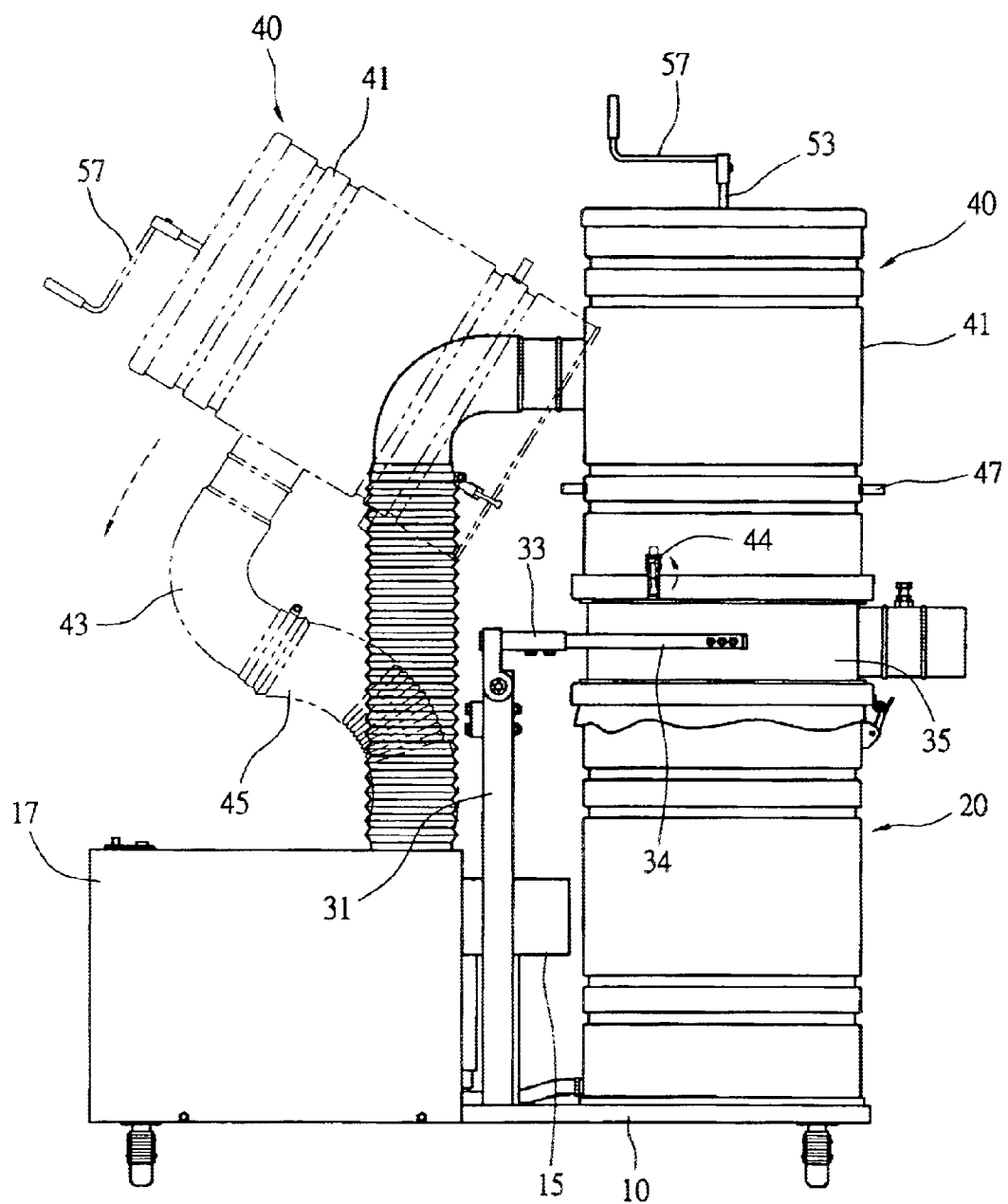
FIG. 4 is a schematic view showing the pre-cleaning action before an actual cleaning is initiated in accordance with the present invention.
Figure 5:
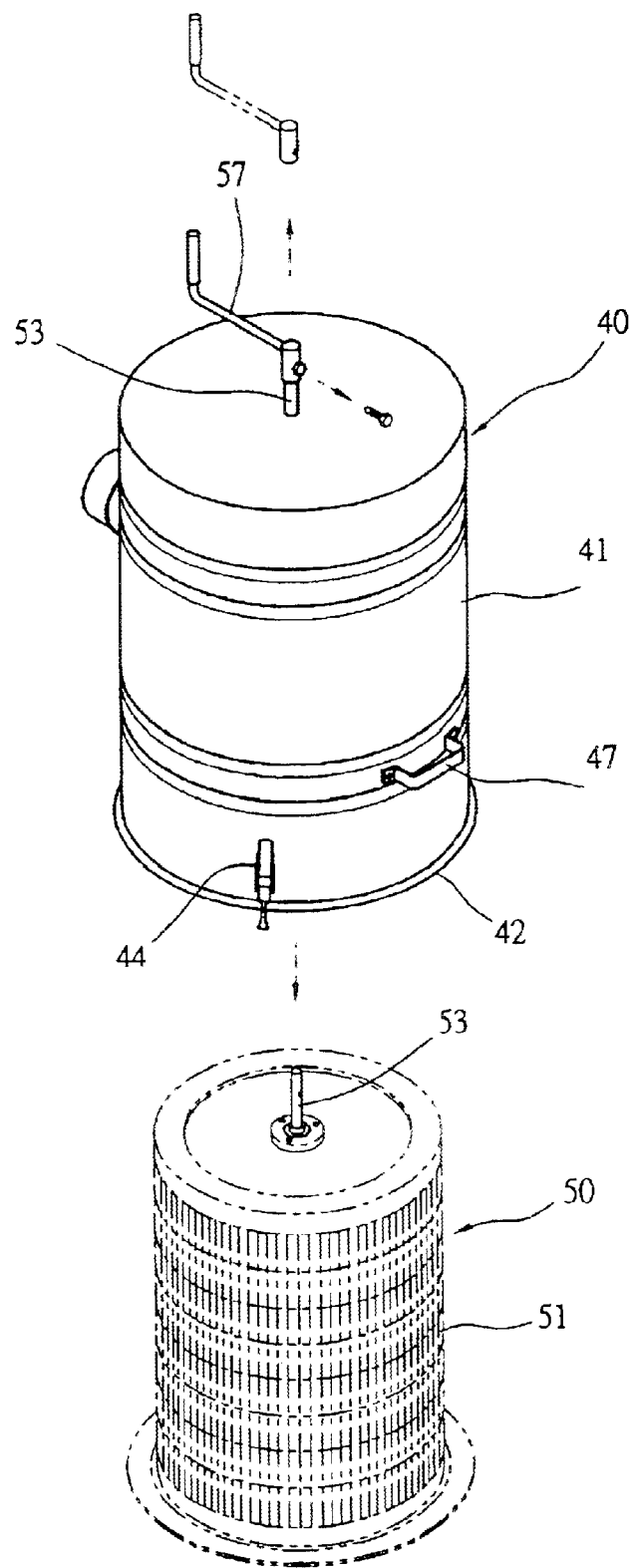
FIG. 5 is a schematic view showing the unloading of the filtering device within the dust-filtering module so as to proceed with cleaning.

When the corrugated filtering board 51 is blocked to a certain extent and a major cleaning is needed, as shown in FIGS. 4 and 5, the fastening member 44 of the external hood body 41 is released, and the external hood body 41 and the dust-filtering module 40 and the mounting body 35 are disengaged. Thus the user can use a connection hose 43 to connect to the soft hose 45 to the blower 15 and the external hood body 41 is lifted up, and the rocking shaft is unloaded 57. The filtering device 50 within the external hood body 41 is removed and the user can proceed with a major cleaning or the replace the filtering device 50.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. An improved structure of a dust-filtering module of a dust-collecting device having a platform mounted with a dust-collecting module and a blower driven by a driving element, and the top end of the dust-collecting module being connected to the dust-filtering module by a mounting body, characterized in that the top end of the mounting body is provided with a top mounting ring having an L-shaped cross-section, which can be mounted onto the bottom edge of the dust-filtering module and a fastening structure is formed between the mounting body and the dust-filtering module such that the dust-filtering module and the mounting body can be engaged with each other and can be separated from each other; and the dust-filtering module is provided with an external hood body connected to a connection hose, and the connection hose can be mounted to a hose connected to the blower, and a filtering device is provided within the dust-filtering module and the filtering device has a corrugated board surrounded thereto and the bottom face of the board is mounted across a bottom rod, and the bottom rod is pivotally mounted with an axle passed through the filtering device, and the circumferential edge of the axle is provided with a plurality of wiping plates which resist the corrugated filtering board, and the axle passed through the top center face of the external hood body, and the axle which passes out of the external hood body is locked to a rocking shaft, thereby an easily cleaned and replaced dust-filtering module of the dust-collecting device is obtained.

2. The dust-filtering module of claim 1, wherein the bottom edge of the external hood body of the dust-filtering module is provided with an arch shaped bent protruded ring edge and a top mounting ring having an L-shaped in cross-section is formed on the top edge of the mounting body of a moving seat, and the inner bottom edge of the top mounting ring is provided with a recessed ringed slot for sealingly engaging of the dust-filtering module and the mounting body.

3. The dust-filtering module of claim 1, wherein a plurality of fastening elements are formed at the external circumferential edge of the dust-filtering module, close to the bottom edge thereof, and the external circumferential edge of the top edge of the mounting body is provided with corresponding fastening plate for mutual engagement.

4. The dust-filtering module of claim 1, wherein the external of the filtering device is provided with a wind speed detector connected to a pressure gauge by a signal tube for the detection of the wind speed passed the filtering device.

5. The dust-filtering module of claim 1, wherein the external circumferential edge, close to the bottom edge of the external hood body of the dust-filtering module is provided with a plurality of corresponding handles so as to facilitate the lifting of the dust-filtering module.

6. The dust-filtering module of claim 1, wherein the center at the top face of the filtering device is provided with a bearing seat having a bearing for the axle to pass through so as to allow smooth rotation of the axle.

7. The dust-filtering module of claim 1, wherein the moving seat is mounted between the dust-connecting module and the blower and the moving seat is provided with two upright rods and the top end of each of the upright rods is pivotally mounted with a side rod which can correspondingly connect to the mounting body.

8. The dust-filtering module of claim 7, wherein the upright rods of the moving seat are provided with a horizontal rod so as to enhance the strength of the module.

9. The dust-filtering module of claim 1, wherein two side rods are locked to the extended rod of the dust-collecting module.

* * * * *